United States Patent
Groulx et al.

(10) Patent No.: US 9,534,782 B2
(45) Date of Patent: Jan. 3, 2017

(54) BURNER UNIT HAVING A LOW VOLTAGE SENSOR

(71) Applicant: Falcon Road Maintenance Equipment, Midland, MI (US)

(72) Inventors: Michael J. Groulx, Midland, MI (US); Thomas K. Klumpp, Midland, MI (US)

(73) Assignee: Falcon Road Maintenance Equipment, Midland, MI (US)

( * ) Notice: Subject to any disclaimer, the term of this patent is extended or adjusted under 35 U.S.C. 154(b) by 0 days.

(21) Appl. No.: 14/528,509

(22) Filed: Oct. 30, 2014

(65) Prior Publication Data
US 2016/0123586 A1   May 5, 2016

(51) Int. Cl.
*F23N 5/24*    (2006.01)
*E01C 19/08*   (2006.01)

(52) U.S. Cl.
CPC ............... *F23N 5/242* (2013.01); *E01C 19/08* (2013.01)

(58) Field of Classification Search
CPC ...... E01C 19/08; E01C 19/1004; E01C 23/06; F23N 5/242
See application file for complete search history.

(56) References Cited

U.S. PATENT DOCUMENTS

| | | | | |
|---|---|---|---|---|
| 3,554,680 A * | 1/1971 | Malavasi | ................ | F23N 5/123 431/24 |
| 4,324,542 A * | 4/1982 | Challet | ................... | F23N 5/203 361/101 |
| 4,395,224 A * | 7/1983 | Cade | ....................... | F23N 5/203 431/31 |
| 4,411,385 A | 10/1983 | Lamkewitz | | |
| 4,455,589 A * | 6/1984 | Riordan | ................... | F23N 5/123 361/190 |
| 4,459,097 A * | 7/1984 | Riordan | ................... | F23N 5/123 431/25 |
| 4,661,684 A * | 4/1987 | Sellers | ..................... | F24H 1/20 122/14.1 |
| 4,662,838 A * | 5/1987 | Riordan | ................... | F23N 5/123 431/25 |
| 4,695,186 A * | 9/1987 | King | ....................... | E01C 23/06 126/343.5 A |
| 4,773,588 A | 9/1988 | Okada | | |
| 5,269,458 A | 12/1993 | Sol | | |
| 5,271,375 A | 12/1993 | Ekermans | | |
| 5,857,262 A | 1/1999 | Bonnema et al. | | |
| 7,797,958 B2 | 9/2010 | Alston et al. | | |

(Continued)

FOREIGN PATENT DOCUMENTS

JP    11230546 A    8/1999

*Primary Examiner* — Abigail A Risic
(74) *Attorney, Agent, or Firm* — Price Heneveld LLP

(57) ABSTRACT

A combustible fuel burner system includes a burner unit, a power source, and a circuit interrupter unit. The circuit interrupter unit has a switch electrically coupled between the power source and the burner unit. The switch has a closed state, wherein the burner unit receives operational electrical power from the power source. The switch moves from a closed state to an open state and electrically disconnects the device from the power source upon a voltage of the power source falling below an interruption threshold. The switch, when in the open state, moves to the closed state upon the voltage of the power source being above a restoration threshold that is higher than the interruption threshold.

20 Claims, 5 Drawing Sheets

(56) References Cited

U.S. PATENT DOCUMENTS

| | | |
|---|---|---|
| 7,935,882 B2 | 5/2011 | Pickard et al. |
| 8,636,502 B2 | 1/2014 | Anderson |
| 2001/0025889 A1 | 10/2001 | Salberg |
| 2003/0062427 A1* | 4/2003 | Bien ................. E01C 19/08 239/135 |
| 2004/0170408 A1* | 9/2004 | Long ................. F24H 1/06 392/441 |
| 2007/0204850 A1* | 9/2007 | Pickard ............. A47J 36/26 126/262 |
| 2009/0052988 A1* | 2/2009 | Belley .............. E01C 19/1004 404/92 |

* cited by examiner

BURNER UNIT HAVING A LOW VOLTAGE SENSOR

FIELD OF THE INVENTION

The present invention relates to a low voltage sensor and circuit interrupter. In particular, the circuit interrupter can be used in connection with a combustible fuel burner system to disrupt power to the burner upon the sensor detecting a low voltage condition of an associated power supply.

BACKGROUND OF THE INVENTION

Certain types of asphalt resurfacing equipment may use an electrically-powered, fuel burning burner to heat asphalt for application to a road surface. Some types of asphalt resurfacing equipment are designed to be portable and may thus use such a burner in an arrangement with an appropriately-rated rechargeable battery to provide the electrical power to the burner. Rechargeable batteries may have a general voltage rating and can be selected such that the rating thereof corresponds to a target operation voltage of the burner. The particular voltage provided by rechargeable batteries, however, may vary and, in particular may decrease, as power is drawn therefrom, from an initial charge, which may result in a voltage that is higher than the particular rating, to a voltage that is substantially lower than the rating.

Because a burner may implement a number of functions that require electrical power (which may be implemented by the same or different components thereof), a drop in voltage of the battery to a level outside of a particular range may result in suboptimal burner operation conditions. Continued use of a diesel burner under such conditions may lead to malfunction of the burner or may damage the burner itself or other components of the associated equipment. Accordingly, a device that can help prevent diesel burner operation under a low-voltage condition may be desired.

SUMMARY OF THE INVENTION

In one aspect of the present invention, a diesel burner system includes a burner unit, a power source, and a circuit interrupter unit. The circuit interrupter unit has a switch electrically coupled between the power source and the burner unit. The switch has a closed state, wherein the burner unit receives operational electrical power from the power source. The switch moves from a closed state to an open state and electrically disconnects the device from the power source upon a voltage of the power source falling below an interruption threshold. The switch, when in the open state, moves to the closed state upon the voltage of the power source being above a restoration threshold that is higher than the interruption threshold.

According to another aspect of the present invention, a diesel burner system includes a burner unit, a battery, and a control unit electrically coupled between the power source and the burner unit. The control unit includes electronic circuitry programmed to automatically control operation of the burner unit. The control unit further includes a switch also electrically coupled between the power source and the burner unit and a microprocessor programmed to move the switch from a closed state to an open state upon a voltage of the power source falling below an interruption threshold. The microprocessor is further programmed to, to move the switch, when in the open state, to the closed state upon the voltage of the power source being above a restoration threshold that is higher than the interruption threshold. The switch electrically disconnects the burner from the power source when in the open position and electrically connects the burner with the power source when in the closed position.

According to another aspect of the present invention, a portable asphalt recycling and asphalt heat management apparatus includes a combustion chamber, a heat accumulator operably coupled to the combustion chamber, a hopper assembly adjacent the heat accumulator, a diesel burner unit coupled with the combustion chamber, and a power source. The apparatus further includes a switch electrically coupled between the power source and the burner unit. The switch has a closed state, wherein the burner unit receives operational electrical power from the power source. The switch moves from a closed state to an open state and electrically disconnecting the device from the power source upon a voltage of the power source falling below an interruption threshold.

These and other features, objects and advantages of the present invention will become apparent upon reading the following description thereof together with reference to the accompanying drawings.

DETAILED DESCRIPTION OF THE PREFERRED EMBODIMENT

Figure 1:
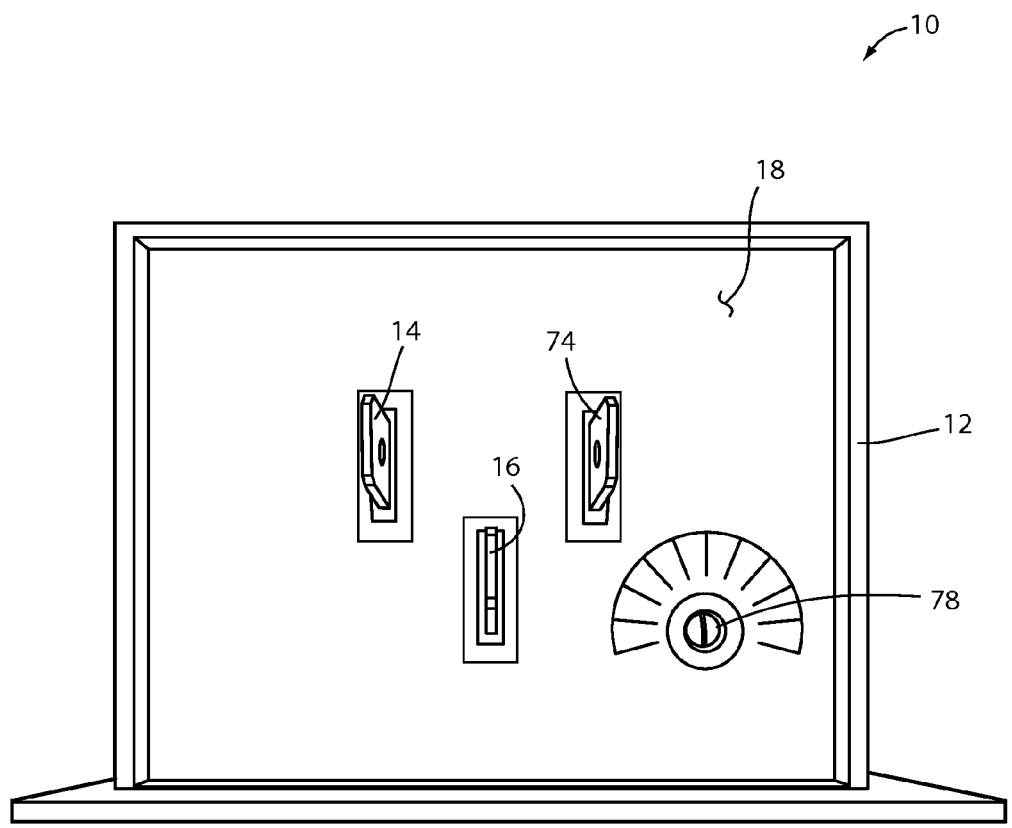
FIG. 1 is a front view of an interrupter switch.

For the purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in following specification, are simply exemplary embodiments. Hence, specific dimensions and other physical characteristics relating to the embodiments disclosed herein are not to be construed as limiting, unless expressly stated otherwise.

Figure 2:
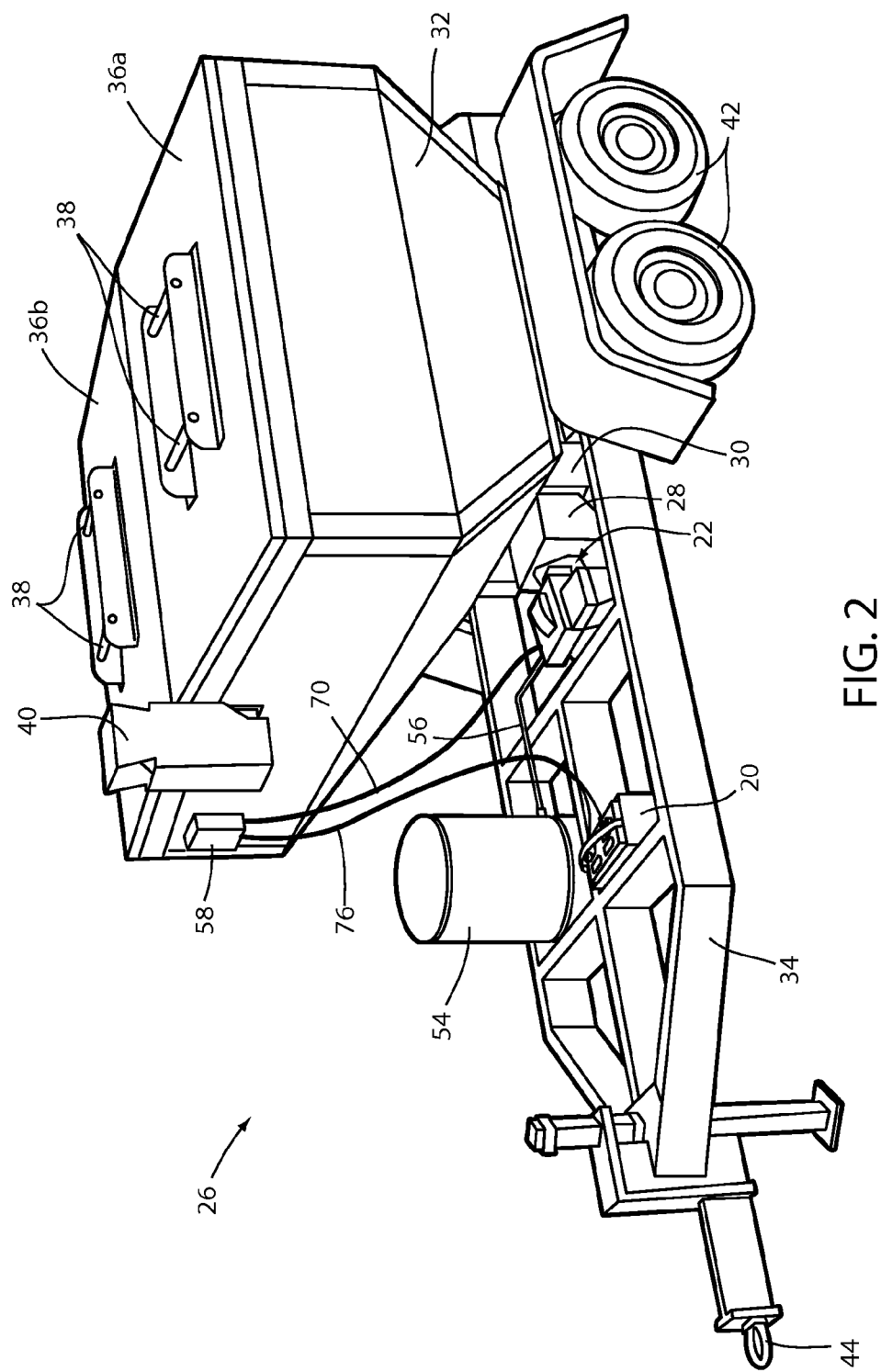
FIG. 2 is a front-side perspective view of a portable asphalt recycling and asphalt heat management apparatus that includes the interrupter switch of FIG. 1.
Figure 7:
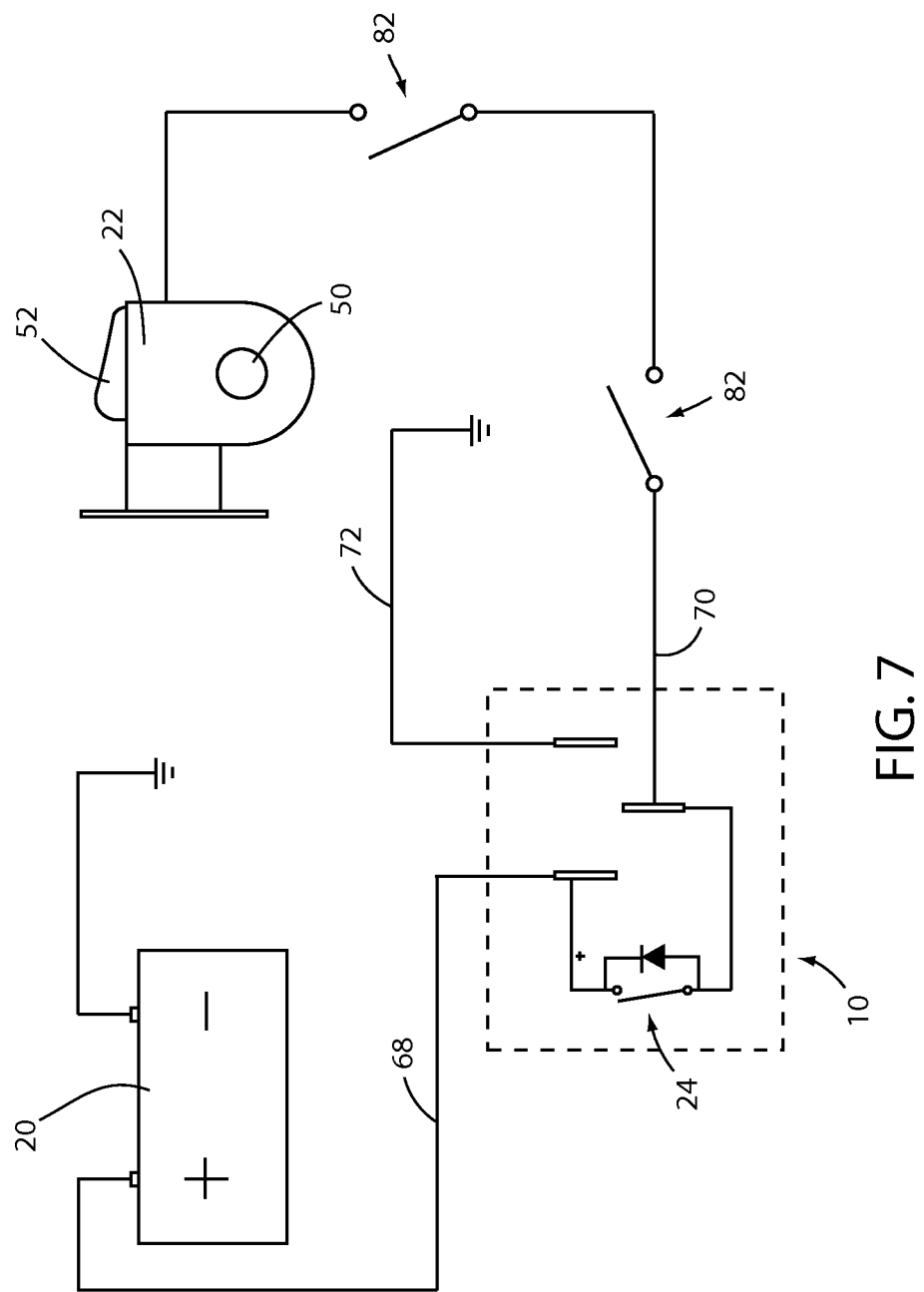
FIG. 7 is a circuit diagram showing electrical connection between a battery, burner unit, and circuit interrupter unit of the portable asphalt recycling and asphalt heat management apparatus of FIG. 2.

As shown in FIG. 1, the reference numeral 10 generally designates a low-voltage circuit interrupter unit. Interrupter unit 10 includes a housing 12 having a lead terminal 14 and load terminal 16 on an exterior 18 thereof. Lead terminal 14 is electrically coupled with a power source such as battery 20, as shown in FIG. 2. Load terminal 16 is electrically coupled to a burner 22, as also shown in FIG. 2. Interrupter unit 10 further includes a switch (shown schematically as switch 24 in FIG. 7) within housing 12 and electrically coupled between lead terminal 14 and load terminal 16. Switch 24 moves from a closed state to an open state, so as to electrically disconnect the burner 22 from the power source, upon a voltage of the power source falling below an interruption threshold. When in the open state, switch 24 moves to the closed state upon the voltage of the power source being above the restoration threshold that is higher than the interruption threshold.

Interrupter unit 10 of FIG. 1 is used in connection with a portable asphalt recycling and asphalt heat management apparatus 26, as shown in FIG. 2. In general, the portable asphalt recycling and asphalt heat management apparatus 26 of FIG. 2, as well as other variations thereof, are designed to perform several different functions with respect to different types of asphalt. For example, such an apparatus 26 can be used to haul asphalt to a job site. Apparatus 26 can also recycle asphalt pieces or millings to prepare a batch of hot mix asphalt. Hot mix asphalt concrete ("HMAC") is produced at about 300° F. This high temperature serves to decrease viscosity and moisture during the manufacturing process, resulting in a durable material. HMAC is most commonly for high-traffic areas, such as busy highways and airports. Warm mix asphalt concrete ("WAM" or "WMA") reduces the temperature required for a manufacturer by adding asphalt emulsions, waxes, or zeolites. Cold mix asphalt concrete, commonly referred to as cold mix, is asphalt emulsified in soapy water and, subsequently, mixed with an aggregate. Such a formulation may reduce or eliminate the need for high temperatures altogether. However, the result of cold mix asphalt may not be nearly as durable as HMAC or WAM, meaning that cold mix asphalt is typically used for low traffic areas or to patch damaged HMAC. In general portable asphalt recycling and asphalt heat management apparatuses, such as apparatus 26, can be used for all types of asphalt mix by recycling used asphalt, heating a hot or warm asphalt mixture to a desired working temperature (200° F.-300° F.) as well as maintaining a cold mix, which may also benefit from being maintained at a temperature at approximately 100° F., to be applied at a repair site.

Although particular recycling and asphalt heat management apparatuses can take on different forms, the example of apparatus 26 shown in FIG. 2 is shown as a trailer-mounted unit having a combustion chamber 28 and a heat accumulator 30 coupled therewith. A hopper 32 is positioned above heat accumulator 30 such that heat generated within heat combustion chamber 28 can be dispersed along lower end of hopper 32 by heat accumulator 30. Apparatus 26 is illustrated in FIG. 2 as having a trailer 34 to which hopper 32, in assembly with heat accumulator 30 and combustion chamber 28, is mounted. It is noted that other arrangements can also be employed in variations of apparatus 26 that are mountable to a vehicle chassis, insertable in a slip-end configuration on a dump truck or the like, or other configurations that allow apparatus 26 to be moved to a job-site. Hopper 32 includes a set of access doors 36a and 36b for loading asphalt into hopper 32. Access doors 36a and 36b further include handles 38 to facilitate operability thereof. Further, access doors 36a and 36b are generally hinged at their outer edges for allowing access to the inside of hopper 32. Access doors 36a and 36b are operable between open and closed positions and are shown in FIG. 2 in the closed position. Hopper 32 further includes a chimney assemble 40 for venting the hopper 32. Hopper 32 may have a tapered configuration which may generally direct asphalt toward the bottom of hopper 32 (i.e. adjacent heat accumulator 30). As shown in FIG. 2, trailer 34 includes a set of wheels 42 and a vehicle mounting apparatus 44 for mounting trailer 34 to a vehicle to carry apparatus 26 to an asphalt repair job-site.

Figure 3:
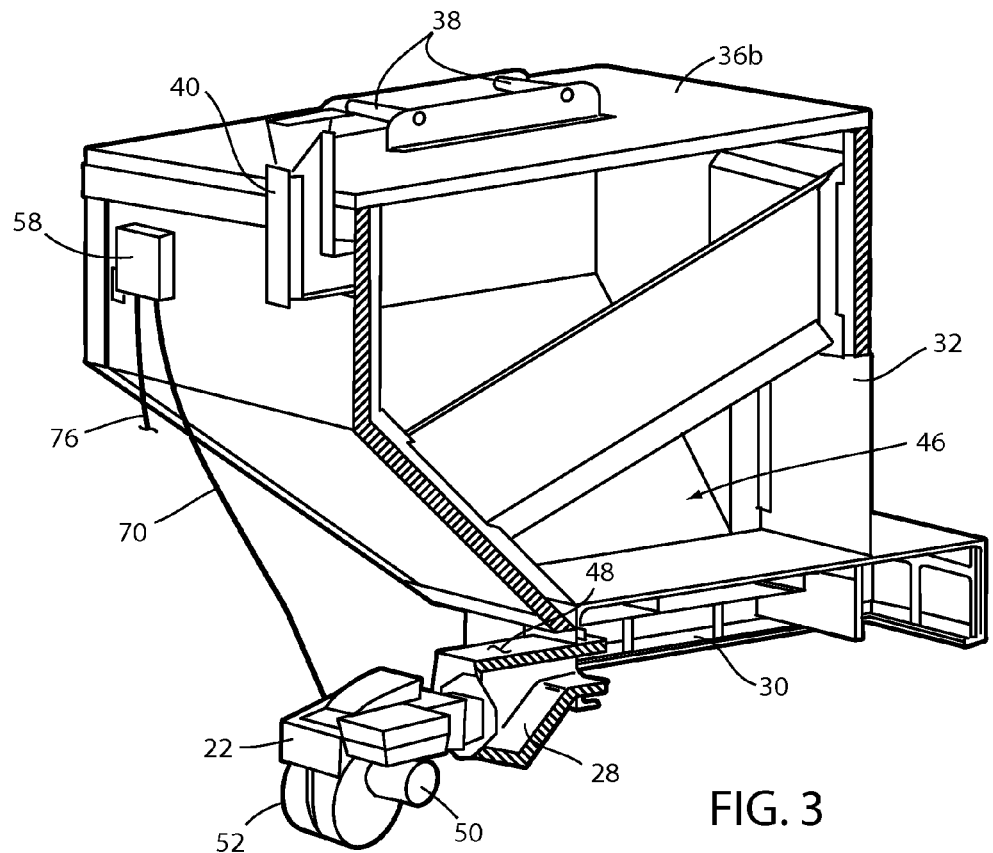
FIG. 3 is a partial cross-sectional view of the portable asphalt recycling and asphalt heat management apparatus of FIG. 2.

As shown in the cross section view of FIG. 3, hopper 32 includes a cavity 46, which is shown in FIG. 3 as an upwardly-opening inner enclosure surrounded by a series of walls. In an example, the walls surrounding hopper cavity 46 may comprise wall systems for distributing heat from heat accumulator 30 therealong, as described further in commonly-assigned U.S. Pat. No. 8,465,225, entitled "ASPHALT RECYCLER AND HEAT MANAGEMENT APPARATUS", the entire disclosure of which is incorporated by reference herein. Cavity 46 can hold an asphalt mixture (e.g. a hot mixture, warm mixture, or cold mixture), or asphalt to be recycled for processing. As further shown in FIG. 3, hopper 32 is shown disposed above heat accumulator 30, which further has combustion chamber 28 operably coupled and open thereto. Combustion chamber 28 comprises an exterior metal shell 48, which can be configured, along a portion thereof to connect with heat accumulator 30. A portion of the combustion chamber 28 can be disposed within, so as to extend into heat accumulator 30. Combustion chamber 28 can, in turn, be operably connected with burner 22, which can be a diesel burner (in other embodiments, burner 22 can be configured to operate to burn other combustible fuels, such as propane, gasoline, or the like). In operation, burner 22 may burn diesel (or another combustible) fuel within or extending into combustion chamber 28, which may produce heat that flows into heat accumulator 30. As further shown in FIG. 3, heat accumulator 30 extends under hopper 32 such that heat accumulator 30 can keep asphalt disposed with hopper 32 heated for asphalt repair application. In other variations, it may be possible to heat hopper 32 directly with a burner similar to burner 22 that is adjacent to hopper 32 (e.g. assembled with or otherwise in close proximity therewith) so as to apply heat directly to an exterior or interior thereof.

The portable asphalt recycling and asphalt heat management apparatus 26, as described above, as well as other variations thereof may use burner 22 in the form of a 12 volt DC diesel burner (in other variations, burner 22 may be configured to operate off of an alternating current and/or to burn other types of combustible fuels, as discussed above) to provide the aforementioned combustion and resultant heating of heat accumulator 30 and any asphalt present within hopper 32 for application to a road surface. An example of such a type of burner 22 may be configured to operate at about 13.5 volts and may receive power from a battery 20 in the form of a 12 volt marine-grade battery. Such a battery 20 can have an initial, full charge of 13.5 volts or higher. In an example, burner 22 may require power from battery 20 at least to drive blower 50, which is included with burner 22, and which supplies air for the diesel fuel combustion process implemented by burner 22. The motor within blower 50 may also be sued to drive fuel pump 52, which provides a flow of diesel fuel for burner 22 from the fuel source, such as from fuel tank 54, by fuel line 56 connected therewith, fuel line 56 fluidically connecting burner 22 with fuel tank 54. In an application, burner 22 may be configured such that blower 50 spins at about 3500 RPMs to provide a desired amount of air within burner 22 to be mixed with diesel fuel provided by fuel pump 52. A predetermined air-fuel mixture may be desired for burner 22 to both ignite reliably and to maintain a desired temperature and quality of combustion within combustion chamber 28. During normal usage of burner 22, including the desired rotation of blower 50, power is drawn from battery 20, thereby causing a decrease in the charge thereof over time. Such a decrease in charge may reduce the voltage level at which battery 20 provides power to blower 50. In an example for each one-volt drop in battery charge, the speed of blower 50 may decrease by approximately 10%, or by about 320 RPMs in the example above.

A decrease in the speed of blower 50 cause inefficiency, malfunction, or damage to burner 22 upon the above-mentioned drop in voltage of battery 20. In an example, a decrease in blower 50 speed can change the air-fuel mixture within burner 22 such that an amount of air available thereto is lower than what may be need to burn all of the fuel provided by fuel pump 52. Such an occurrence can lower the heat output of burner 22 and may further result in a "dirty" flame condition that may produce an excessive amount of soot (due to the accumulation of unburned, or less than fully-burned fuel), which may cover the glass CAD cell eye (not shown) internal to burner 22. In general a CAD cell eye is used by a control system (discussed further below) of apparatus 26 in the control and monitoring of the ignition of the fuel-air mixture within burner 22. CAD cell eye my facilitate use as such by detecting resistance value through observable light within burner 22. A dirty CAD cell eye changes the amount of light detected and may erroneously result in shut off of burner 22 by the control system (discussed further below), resulting in an ignition failure.

Additionally, or alternatively reduced speed of blower 50 may result in the air within the fuel-air mixture of burner 22 to be insufficient for ignition, resulting in the fuel provided to burner 22 not being ignited at all. Such a condition may occur under a generally rapid and/or significant drop in voltage. In certain applications, the control of burner 22 provides diesel fuel via fuel pump 52 to burner 22, which in turn flows into a combustion chamber 28, for example up to about 15 seconds. Upon subsequent attempts to ignite burner 22, which may be unsuccessful due to the low-voltage condition, combustion chamber 28 could get "flooded" with diesel fuel. If sufficient time is not given before a subsequent re-ignition attempt after a recharge of battery 20, such fuel may remain within combustion chamber 28. Excessive fuel within combustion chamber 28 can ignite upon a subsequent successful start. Under certain conditions, burning of such excess fuel can cause smoke that can cloud the CAD cell eye (leading back to the potential issues discussed above with respect thereto) or damage to burner 22 itself.

The incorporation of interrupter unit 10, as described above, between battery 20 and burner 22 can help reduce or eliminate occurrence of the above-described scenarios by preventing ignition of or turning off burner 22 in response to a drop in the voltage of battery 20, before such voltage reaches a level which may make either of the above-described scenarios likely. In this manner, the above-mentioned interruption threshold, at which switch 24 (FIG. 7) moves to the open position, thereby cutting off power from battery 20 to burner 22, may be set at 11.5 volts. Accordingly, when burner 22 is used in connection with battery 20 in a fully-charged initial state, with battery 20 providing power to burner 22 at about 13.5 volts, switch 24 will be in the closed position, such that burner 22 can function normally. Such normal functioning of burner 22 will continue to be allowed by interrupter unit 10, by way switch 24 remaining in the closed position, as use of burner 22 and corresponding operation of blower 50 (and usage of other electrically powered components of apparatus 26 which may also be powered by battery 20) drains the power of battery 20 through an amount which burner 22 can still operate and ignite properly.

In an example, normal operation of burner 22 may be possible with a voltage of less of 13.5 volts, but greater than a voltage of 11.5 volts. Accordingly, by setting switch 24 to move to the open position upon the voltage being less than 11.5 volts power to burner 22 is cut off when the voltage of battery 20 is insufficient for reliable operation of burner 22. Other values for the interruption threshold are possible and can be implemented in a variation of switch 24 that corresponds to an appropriate interruption threshold, depending on factors such as the voltage rating of burner 22, blower 50, or other features thereof, as well as particular characteristics of blower 50 which may affect the response thereof to particular voltage levels. It is noted that switch 24 may be operative to cut off power to burner 22 during use thereof, which results in the voltage of battery 20 dropping to below the interruption threshold. Additionally, switch 24 may be operable to cut off power to burner 22 when apparatus 26, including burner 22, is in an off state. This can prevent a failed ignition attempt after drainage of battery 20 when apparatus 26 is not use, such as while being stored or the like.

In an additional aspect, interrupter unit 10 can be configured to promote adequate recharging of battery 20, such as after movement of switch to the open state in response to a previous voltage drop. As mentioned above, switch 24 can automatically return to the closed state (in which interrupter unit 10 permits battery 20 to provide power to burner 22) only upon the voltage of battery 20 being at or above a predetermined restoration threshold that is higher than the interruption threshold. In an example, the restoration threshold can be about 12.5 volts, thereby requiring battery 20 to be recharged, after interruption by unit 10 at a voltage level of 11.5 volts, until battery 20 is charged to the point where it provides power at least 12.5 volts. By configuring restoration threshold of switch 24 at a level that is below the initial maximum charge for battery 20 use of burner 22 is not negatively impacted due to potential degradation of battery 20 to a point where a maximum charge is no longer possible. In a further example, the interruption threshold and restoration threshold can be benchmarked off of a target operational voltage for burner 22. As discussed above, the example of burner 22 discussed herein can have a target operational voltage of about 12 volts. In such an example, the interruption threshold can be within about 5% less than such a target operational voltage and the restoration threshold can be about 5% greater than the target operational voltage. In other examples of burner 22 with different operational target volts just, a similar relationship can be reflected.

Further, to prevent ignition of burner 22 when combustion chamber 28 is in a flooded state, as discussed above, interrupter unit 10 can further be configured to further require a lapse of a predetermined time period, or predetermined delay interval, before switch 24 may return to the closed state including even after an acceptable recharge of battery 20. Such a time period can be, for example between about 30 seconds and up to about 5 minutes. In one embodiment, as shown in FIG. 1, interrupter unit 10 can include a time adjustment dial 78 that can be adjustable by a user to allow the user to change such a delay interval, such as between the limits discussed or other predetermined limits.

Figure 4:
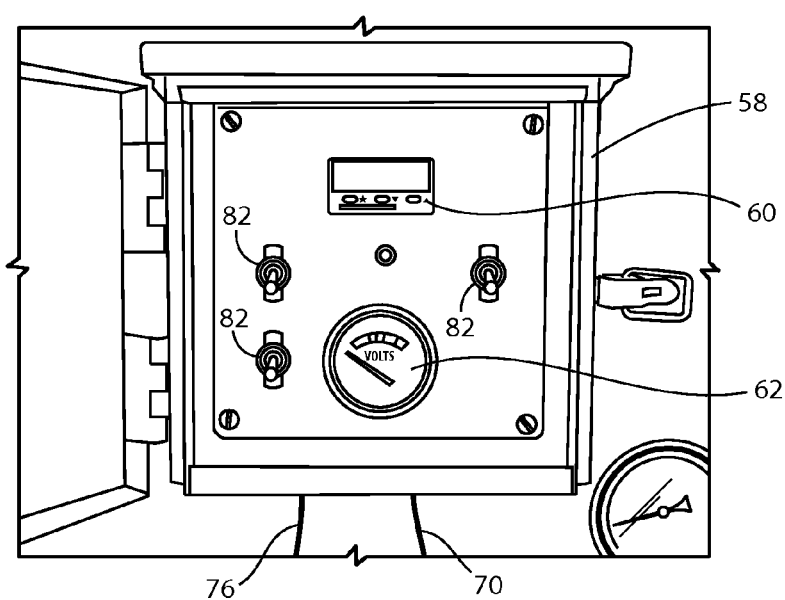
FIG. 4 is a front view of a control unit of the portable asphalt recycling and asphalt heat management apparatus of FIG. 1.
Figure 5:
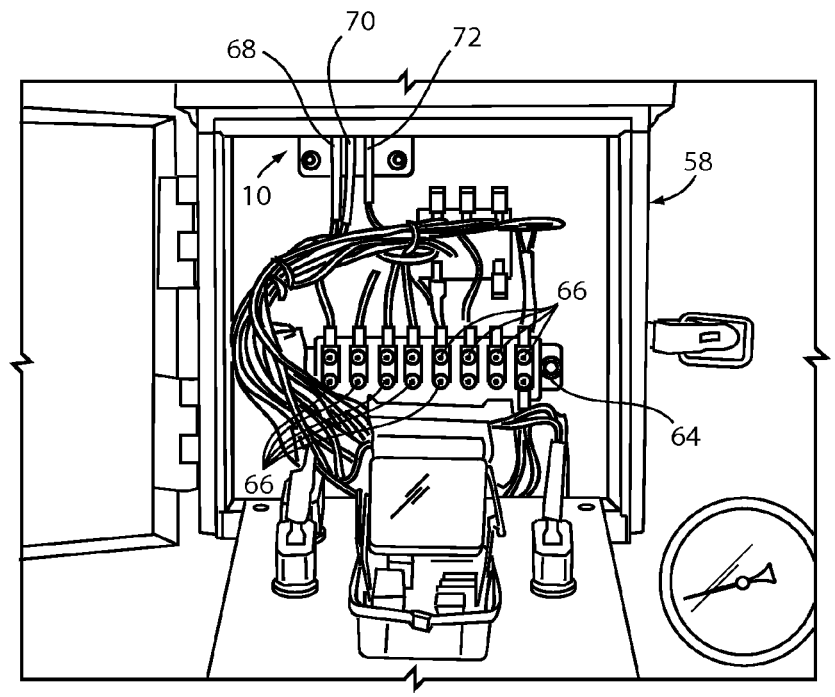
FIG. 5 is a front view of internal features of the control unit of FIG. 4.
Figure 6:
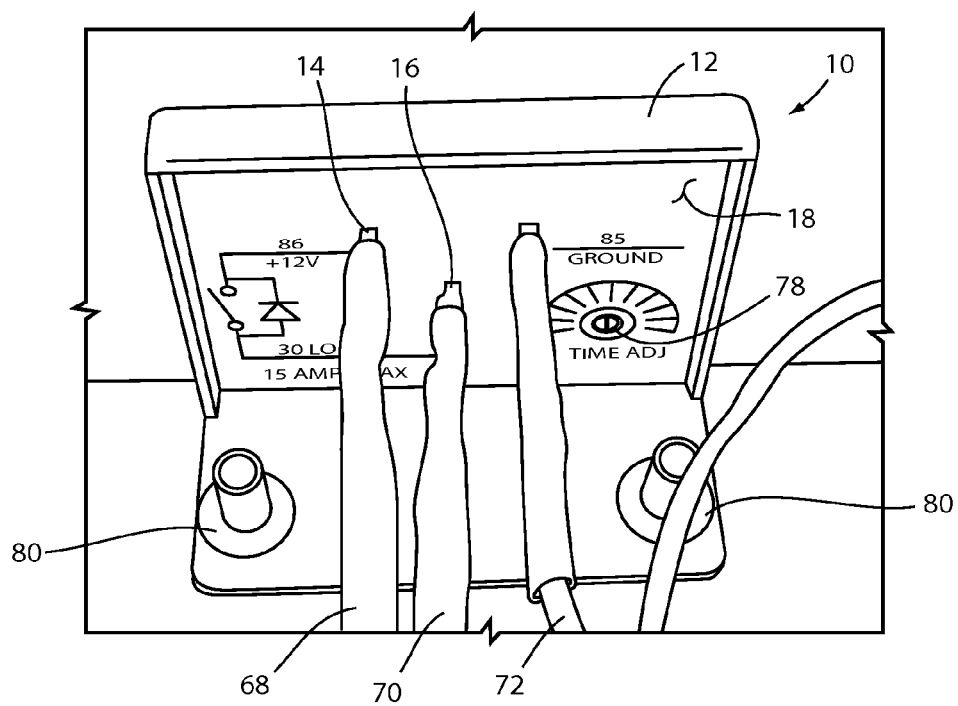
FIG. 6 is a front perspective view of details of the internal control unit features of FIG. 5, including a circuit interrupter unit.

Turning now to FIGS. 4-6, apparatus 26 can include a control unit 58, which can serve to centralize control and operation of the various features of apparatus 26. As illustrated in FIG. 2, control unit 58 can be mounted on hopper 32. Control unit 58 can be connected with various components of apparatus 26, as discussed further below. As shown in FIG. 4, control unit 58 can include an information display 60, as well as a voltage meter 62, which can provide information to a user regarding the status of various aspects of apparatus 26. As shown in FIG. 5, internal to control unit 58, such as behind an access panel 63 control unit 58 can house various internal components related to the control of apparatus 26. Among other things, such features can include an input terminal 64 and one or more output terminals 66. One such output terminal 66 can connect burner lead line 68 with interrupter unit 10, which can itself be contained within control unit 58. Burner lead line 68 can connect with lead terminal 14 of interrupter unit 10, such as by soldering, mechanical electrical couplings, or the like. Similarly, burner load line 70 can extend from load terminal 16, and can further extend outwardly from control unit 58, as shown in FIGS. 2 and 3. Burner load line 70 can connect to load terminal 16 and can further electrically connect interrupter unit 10 with burner 22. Further, as shown in FIG. 6, a ground line 72 can be connected with a ground terminal 74 of interrupter unit 10, which may be connected to a ground of apparatus 26 to prevent, for example buildup of an electrical charge within interrupter unit 10, such as within housing 12 thereof.

Control unit 58, as shown in FIG. 2, can be connected, via input terminal 64 to battery 20 such that interrupter unit 10 and various other electrical components of apparatus 26 can receive power by their connection with output terminals 66 of control unit 58. As such, interrupter unit 10, and thereby switch 24, is electrically connected between battery 20 and burner 22. As shown in FIG. 6, interrupter unit 10 can be coupled within control unit 58 in a manner such that interrupter unit 10 can be retrofitted into the control unit 58 of an existing apparatus 26. In this manner, burner lead line 68 and burner load line 70 can be achieved by cutting an electrical connection between output terminal 66 and burner 22, each of which can be connected with lead terminal 14 and load terminal 16, as appropriate and as discussed above. Interrupter unit 10 can be secured within control unit 58 by adhesives or mechanical connections such as rivets 80, as illustrated.

In this manner, interrupter unit 10 can be incorporated with apparatus 26 such that, when needed, interrupter 10 can cut off power to burner 22 without interrupting power provided to other components of apparatus 26, such as information display 60 or the like, or any switches available for user interaction within control unit 58, as shown in FIG. 4, which may provide for user control of additional features of apparatus 26. As further shown in FIG. 7 however, some of such switches 82 may be used for control of various aspects of burner 22, such as powering on or off and/or ignition thereof. Further, it is noted that by way of the motor of blower 50 also controlling operation of fuel pump 52, cutting off power to burner 22 by way of tripping of interrupter unit 10 can disable burner 22 without physically decoupling the fuel supply from burner 22 elsewhere, such as by way of a valve within fuel line 56 or the like.

Control unit 58 can further include electronic circuitry (not shown) for the control of the operation of burner 22, such as to ignite and burn, as needed, to maintain a predetermined temperature within heat accumulator 30 or hopper 32, as can be measured by one or more thermometers positioned therein or adjacent thereto. Such circuitry can derive power from battery 20 through connection with one of the output terminals 66, for example, and can further be connected therewith to be unaffected by the particular state of switch 24. Switch 24 can include or can be otherwise connected with circuitry (such as a microprocessor, application-specific integrated circuit, or the like) to control movement thereof between the open and closed states. In other examples switch 24 can be magnetic or piezoelectric so as to automatically move itself between the open and closed configurations, as discussed above. In another embodiment, switch 24 can be connected with the control circuitry of control unit 58 or the like such that switch 24 can be caused to move, as described above, between the open and closed states, by the general control circuitry of control unit 58. In such an embodiment, switch 24 may be integrated into control unit 58 without inclusion in a separate unit, such as interrupter unit 10.

It will become apparent to those skilled in the art that various modifications to the preferred embodiment of the invention as described herein can be made without departing from the spirit or scope of the invention as defined by the appended claims.

The invention claimed is:

1. A combustible fuel burner system, comprising:
   a burner unit;
   a power source; and
   a circuit interrupter unit including a switch electrically coupled between the power source and the burner unit, the switch having a closed state, wherein the burner unit receives operational electrical power from the power source, the switch moving from the closed state to an open state and electrically disconnecting the burner unit from the power source upon a voltage of the power source falling below an interruption threshold, and the switch, when in the open state, moving to the closed state upon the voltage of the power source being above a restoration threshold that is higher than the interruption threshold only after remaining in the open state for a predetermined delay interval.

2. The combustible fuel burner system of claim 1, wherein the interruption threshold is 11.5 volts.

3. The combustible fuel burner system of claim 1, wherein the restoration threshold is 12.5 volts.

4. The combustible fuel burner system of claim 1, wherein the interruption threshold and the restoration threshold are benchmarked off of a target operation voltage of the burner unit, the interruption threshold being less than the target operation voltage, and the restoration threshold being greater than the target operation voltage.

5. The combustible fuel burner system of claim 4, wherein the interruption threshold and the restoration threshold vary from the target operation voltage by within 5 percent.

6. The combustible fuel burner system of claim 1, further including an adjustment dial adjustable by a user to set the predetermined delay interval.

7. The combustible fuel burner system of claim 1, wherein the power source is 12-volt battery, the switch allowing the battery to supply power to the burner unit for operation thereof when the switch is in the closed state, and the switch preventing the battery from supplying power to the burner unit when the switch is in the open state, thereby preventing operation thereof.

8. A combustible fuel burner system, comprising;
   a burner unit;
   a battery; and
   a control unit electrically coupled between the power source and the burner unit, the control unit including electronic circuitry programmed to automatically control operation of the burner unit, the control unit further including switch also electrically coupled between the power source and the burner unit and a microprocessor programmed to move the switch from a closed state to an open state upon a voltage of the power source falling below an interruption threshold and, when in the open state, to move the switch to the closed state upon the voltage of the power source being above a restoration threshold that is higher than the interruption threshold only after remaining in the open state for a predetermined delay interval, the switch electrically disconnecting the burner unit from the power source when in the open state and electrically connecting the burner unit with the power source when in the closed state.

9. The combustible fuel burner system of claim 8, wherein the interruption threshold is 11.5 volts.

10. The combustible fuel burner system of claim 8, wherein the restoration threshold is 12.5 volts.

11. The combustible fuel burner system of claim 8, wherein the switch is included in an interrupter unit having a housing with a lead terminal and a load terminal on an exterior thereof, the lead terminal electrically coupling the switch with the battery, and the load terminal electrically coupling the burner unit with the switch.

12. The combustible fuel burner system of claim 8, further including a combustible fuel source fluidically coupled with the burner unit, wherein:
the burner unit receives power from the battery to control a flow of fuel from the combustible fuel source and to ignite the fuel in a controlled manner; and
the microprocessor, by moving the switch to the open position upon a voltage of the power source falling below the interruption threshold, prevents the burner from attempting to ignite the fuel.

13. The combustible fuel burner system of claim 12, wherein control unit does not fluidically decouple the burner unit from the combustible fuel source when the microprocessor moves the switch from the closed state to the open state.

14. The combustible fuel burner system of claim 1, wherein the predetermined delay interval is at least 30 seconds.

15. A portable asphalt recycling and asphalt heat management apparatus comprising:
a hopper assembly;
a burner unit adjacent the hopper assembly;
a power source; and
a circuit interrupter including a switch electrically coupled between the power source and the burner unit, the switch having a closed state wherein the burner unit receives operational electrical power from the power source, the switch moving from a closed state to an open state and electrically disconnecting the device from the power source upon a voltage of the power source falling below an interruption threshold, and the switch, when in the open state, moving to the closed state upon the voltage of the power source being above a restoration threshold that is higher than the interruption threshold only after remaining in the open state for a predetermined delay interval.

16. The portable asphalt recycling and asphalt heat management apparatus of claim 15, wherein:
the power source is a 12-volt battery; and
the interruption threshold of the switch is between about 10.5 volts and about 12.5 volts.

17. The portable asphalt recycling and asphalt heat management apparatus of claim 15, wherein the circuit interrupter, when the switch is in the open state, moves the switch to the closed state upon the voltage of the power source being above a restoration threshold that is higher than the interruption threshold.

18. The portable asphalt recycling and asphalt heat management apparatus of claim 17, wherein the restoration threshold of the switch is between about 12 volts and about 13.5.

19. The portable asphalt recycling and asphalt heat management apparatus of claim 15:
further including a control unit and a plurality of electrically-powered components;
wherein the control unit is electrically coupled with the power source at an input terminal thereof and includes a plurality of output terminals, respective ones of the output terminals being coupled with the burner unit and ones of the plurality of electrically-powered components; and
wherein the circuit interrupter is electrically coupled between the power source and the burner unit between the one of the output terminals coupled with the burner unit and the burner unit.

20. The portable asphalt recycling and asphalt heat management apparatus of claim 15:
further including a control unit having a housing coupled with a portion of the apparatus;
wherein the circuit interrupter includes an interrupter unit housing containing the switch, the interrupter unit housing further having a lead terminal and a load terminal on an exterior thereof, the lead terminal electrically coupling the switch with the power source, and the load terminal electrically coupling the burner unit with the switch, the interrupter unit housing being coupled within the control unit housing.

* * * * *